(12) United States Patent
Lee et al.

(10) Patent No.: US 10,016,833 B2
(45) Date of Patent: Jul. 10, 2018

(54) SOLDER BALL MOUNTER

(71) Applicant: Samsung Electronics Co., Ltd., Suwon-si, Gyeonggi-do (KR)

(72) Inventors: Seok-Yong Lee, Cheonan-si (KR); Yo-Se Eum, Cheonan-si (KR); Tea-Seog Um, Asan-si (KR); Kyoung-Bok Cho, Cheonan-si (KR); Jeong-Jin Lee, Seongnam-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/171,758

(22) Filed: Feb. 3, 2014

(65) Prior Publication Data

US 2015/0001278 A1    Jan. 1, 2015

(30) Foreign Application Priority Data

Jun. 26, 2013  (KR) .......................... 10-2013-0074039

(51) Int. Cl.
*B23K 3/06* (2006.01)

(52) U.S. Cl.
CPC .................................. *B23K 3/0623* (2013.01)

(58) Field of Classification Search
CPC ... H05K 3/3452; H05K 3/3478; B23K 3/0623
USPC ....................................... 228/33, 39, 41, 246
See application file for complete search history.

(56) References Cited

U.S. PATENT DOCUMENTS

| | | | |
|---|---|---|---|
| 6,402,014 B1 * | 6/2002 | Inoue et al. .................. | 228/245 |
| 7,472,473 B2 * | 1/2009 | Kawamura et al. ............ | 29/747 |
| 7,854,366 B2 * | 12/2010 | Sakaguchi et al. ...... | 228/180.22 |
| 8,434,664 B2 * | 5/2013 | Aoya .......................... | 228/173.1 |
| 8,523,046 B1 * | 9/2013 | Gruber et al. ................. | 228/246 |
| 2002/0058406 A1 * | 5/2002 | Mukuno et al. .............. | 438/626 |
| 2003/0164395 A1 * | 9/2003 | Tong et al. ................ | 228/123.1 |
| 2006/0086777 A1 * | 4/2006 | Itoh et al. ...................... | 228/253 |
| 2008/0142969 A1 * | 6/2008 | Hakuno ........................ | 257/738 |
| 2009/0008433 A1 * | 1/2009 | Sakaguchi et al. ........... | 228/245 |
| 2009/0030640 A1 * | 1/2009 | Takeuchi et al. ............... | 702/95 |
| 2009/0130838 A1 * | 5/2009 | Sakaguchi et al. ........... | 438/613 |
| 2009/0283574 A1 * | 11/2009 | Okazaki et al. .............. | 228/203 |
| 2009/0294516 A1 * | 12/2009 | Sawa et al. ................... | 228/246 |
| 2009/0307900 A1 * | 12/2009 | Ikeda ............................. | 29/743 |

FOREIGN PATENT DOCUMENTS

| | | |
|---|---|---|
| JP | H11297886 A | 10/1999 |
| JP | 2007152613 A | 6/2007 |
| JP | 2007335828 A | 12/2007 |
| JP | 2010177347 A | 8/2010 |

* cited by examiner

*Primary Examiner* — Erin B Saad
*Assistant Examiner* — Carlos J Gamino
(74) *Attorney, Agent, or Firm* — Renaissance IP Law Group LLP (57) ABSTRACT

An solder ball mounter includes a stage configured to support a substrate, a ball placer head configured to provide solder balls, and a solder ball mask configured to align the solder balls with the substrate. The solder ball mask includes an upper mask layer including an upper opening having a first diameter, a middle mask layer including a middle opening having a second diameter that is larger than the first diameter, and a lower mask layer.

8 Claims, 6 Drawing Sheets

SOLDER BALL MOUNTER

CROSS-REFERENCE TO RELATED APPLICATION

This application claims priority under 35 U.S.C. § 119 to Korean Patent Application No. 10-2013-0074039 filed on Jun. 26, 2013, the disclosure of which is hereby incorporated by reference in its entirety.

BACKGROUND

1. Technical Field

Embodiments of the inventive concept relate to a solder ball mounter with a mask for mounting solder balls.

2. Description of Related Art

With rapid miniaturization of electronic devices, electronic components such as semiconductor devices to be mounted on the electronic devices also require miniaturization. The thickness of the semiconductor devices may also need to be reduced. Also, higher density and more connection terminals are demanded in these electronic components. In line with these requirements, the surface mounting technologies, i.e., mounting external terminals on a substrate such as a printed circuit board through flip-chip technologies or the like, are generally used for the assembly of electronic devices.

SUMMARY

Embodiments of the inventive concept provide a solder ball mounter using a solder ball mask.

Embodiments of the inventive concept provide a method of mounting solder balls using a solder ball mask.

Aspects of the inventive concept should not be limited by the above description, and other unmentioned aspects will be clearly understood by one of ordinary skill in the art from example embodiments described herein.

In accordance with an aspect of the inventive concept, a solder ball mounter includes a stage configured to support a substrate having electrodes formed thereon, a ball placer head configured to provide solder balls, and a solder ball mask configured to align the solder balls with the electrodes formed on the substrate. The solder ball mask includes an upper mask layer including at least one upper opening having a first diameter, a middle mask layer including at least one middle opening having a second diameter that is larger than the first diameter, and a lower mask layer. The middle mask layer may be thicker than the upper mask layer.

In accordance with an aspect of the inventive concept, a solder ball mounter includes a stage including a substrate mounter configured to move up and down and a mask supporter substantially surrounding the substrate mounter, a solder ball mask overlying the mask supporter, and a ball placer head overlying the solder ball mask. The solder ball mask includes an upper opening having a first diameter, a middle opening having a second diameter greater than the first diameter, and a lower opening having a third width greater than the second diameter.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference numerals refer to like parts throughout the different views. The drawings are not necessarily to scale, emphasis instead being placed upon illustrating the principles of the inventive concepts. In the drawings.

DETAILED DESCRIPTION OF EMBODIMENTS

Various embodiments will now be described more fully with reference to the accompanying drawings in which some embodiments are shown. These inventive concepts may, however, be embodied in different forms and should not be construed as limited to the embodiments set forth herein. Although a few embodiments of the inventive concept will be shown and described, it will be appreciated by those of ordinary skill in the art that changes may be made in these exemplary embodiments without departing from the principles and spirit of the inventive concept, the scope of which is defined by the claims and their equivalents.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, components, and/or group thereof, but do not preclude the presence or addition of one or more other features, items, steps, operations, elements, components, and/or groups thereof.

Terms such as "beneath," "below," "lower," "above," "upper" and the like may be used herein to describe the relationship of one element or feature to another, as illustrated in the drawings. It will be understood that such descriptions are intended to encompass different orientations in use or operation in addition to orientations depicted in the drawings. For example, if a device is turned over, elements described as "below" or "beneath" other elements or features would then be oriented "above" the other elements or features. Thus, the term "below" is intended to mean both above and below, depending upon overall device orientation. Also, the device may be reoriented in other ways (rotated 90 degrees or at other orientations) and the descriptors used herein should be interpreted accordingly.

Throughout the drawings and the description, parts that appear in more than one drawing or are mentioned in more than one place in the description will be consistently denoted by the same respective reference numerals and described in detail only once.

Hereinafter, an embodiment of the inventive concept will be described with reference to the accompanying drawings. In the inventive concept, a semiconductor wafer, a printed circuit board, a ceramic substrate, and the like may be used as a substrate having electrodes on a top surface thereof, on which conductive balls are to be mounted. However, in the following embodiments of the inventive concept, the printed circuit board will be described as an example. As an adhesive material, a flux, a solder paste, a conductive adhesive, or the like is used, but in the following embodiments of the inventive concept, the flux will be described as an example. Further, as the conductive balls, solder balls will be described as an example.

Figure 1:
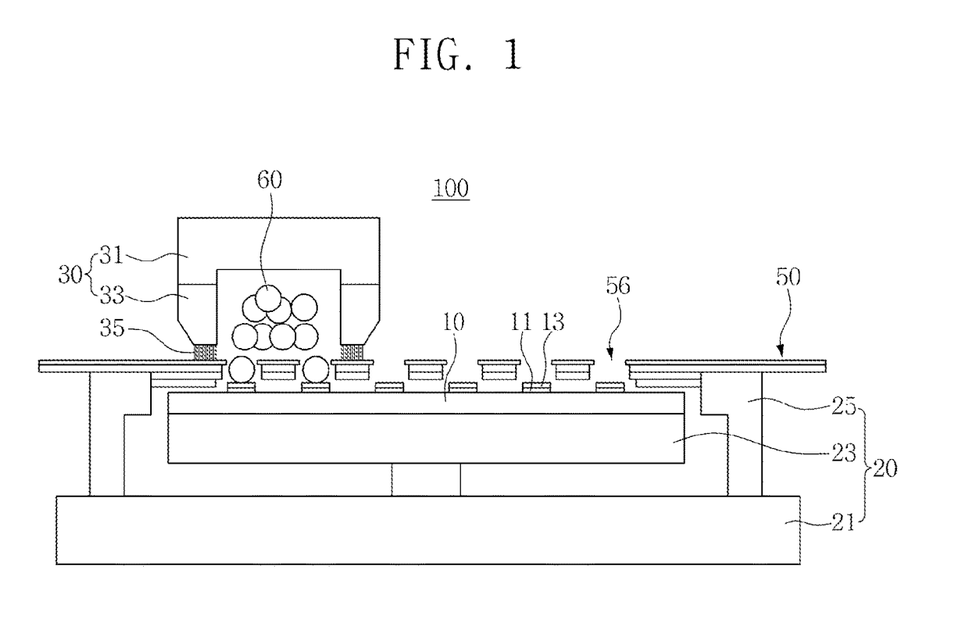
FIG. 1 is a schematic lateral cross-sectional view illustrating a solder ball mounter according to an embodiment of the inventive concept.

FIG. 1 is a schematic cross-sectional view illustrating a solder ball mounter according to an embodiment of the inventive concept. Referring to FIG. 1, a solder ball mounter 100 according to an embodiment of the inventive concept may include a stage 20, a ball placer head 30, and a solder ball mask 50.

The stage 20 may include a base 21, a substrate mounter 23 disposed on a central portion of the base 21, and a mask supporter 25 disposed on a peripheral portion of the base 21. The mask supporter 25 may surround the substrate mounter 23 in a top plan view. The base 21 may support the substrate mounter 23 and the mask supporter 25. The base 21 may include driving elements (not illustrated) configured to move up and down the substrate mounter 23 vertically and rotate the substrate mounter 23 horizontally. The substrate mounter 23 may be disposed on the central portion of the base 21, and a substrate 10 may be mounted on a top surface of the substrate mounter 23. The substrate mounter 23 may include a vacuum suction unit (not illustrated) configured to fix the substrate 10 mounted thereon. The substrate mounter 23 may include a rising and falling unit that is independently movable vertically. By raising or lowering the substrate mounter 23, the distance between the solder ball mask 50 and the substrate 10 may be controlled. The mask supporter 25 may be disposed on the peripheral portion of the base 21 to support the solder ball mask 50. The mask supporter 25 may include a vacuum suction unit (not illustrated) configured to fix the solder ball mask 50.

The solder ball mask 50 may be supported by the mask supporter 25 to be placed on the substrate 10. For example, a portion of the solder ball mask 50 may be placed on the mask supporter 25, and another portion of the solder ball mask 50 may be in contact with a side of the mask supporter 25 or be close to the side of the mask supporter 25. The solder ball mask 50 may include mask openings 56, through which solder balls 60 may pass. The mask openings 56 may be aligned with electrodes 11 on the substrate 10. The solder ball mask 50 may include a metal such as nickel (Ni) or a metal alloy containing Ni.

The ball placer head 30 may include a ball provider 31 and an air generator 33. The ball provider 31 may provide a plurality of solder balls 60 onto the solder ball mask 50. The air generator 33 may be disposed on a bottom surface of the ball provider 31. The air generator 33 may be spaced apart from a top surface of the solder ball mask 50 by a predetermined gap. The air generator 33 may form an air curtain 35 by jetting air or $N_2$ gas across the gap. The air curtain 35 may substantially prevent the solder balls 60 provided from the ball provider 31 from escaping to the outside. Thus, the solder balls 60 may be located and distributed within the ball placer head 30. The ball placer head 30 may move and rotate vertically and horizontally. The ball placer head 30 may move vertically to maintain the gap between the ball placer head 30 and the solder ball mask 50. The ball placer head 30 may repeatedly move horizontally on the solder ball mask 50 to place the solder balls 60 onto the substrate 10 through the mask openings 56 which extend through the solder ball mask 50.

Figure 2A:
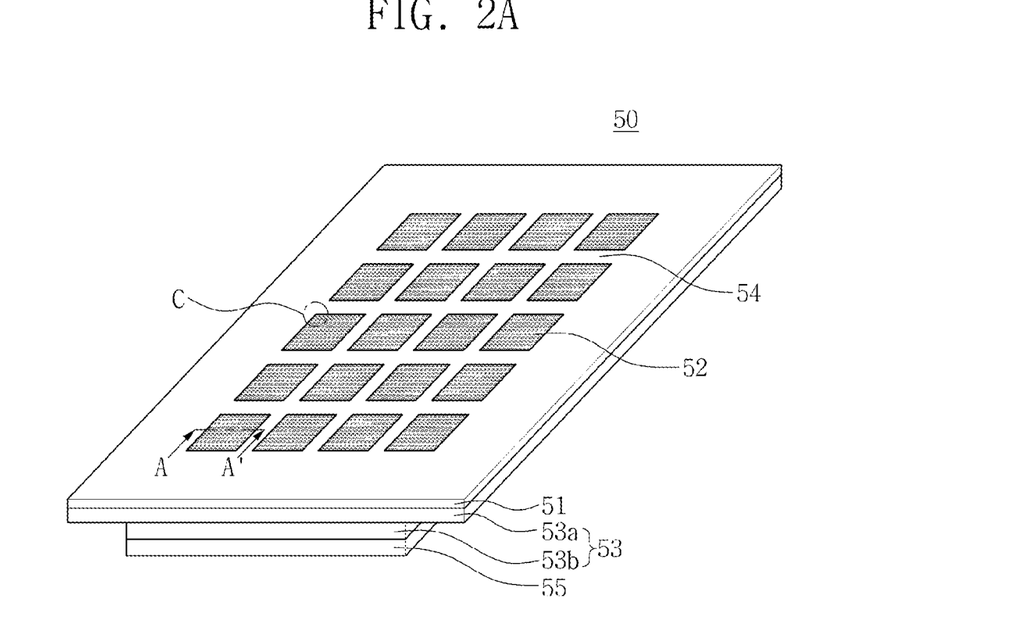
FIG. 2A is a perspective view illustrating a solder ball mask according to an embodiment of the inventive concept.

FIG. 2A is a perspective view illustrating the solder ball mask 50 according to an embodiment of the inventive concept. Referring to FIG. 2A, the solder ball mask 50 may include a plurality of unit masks 52 arranged in an island form, and a lattice-shaped mask boundary 54 defining the unit masks 52 may be disposed between the adjacent unit masks 52.

The solder ball mask 50 may include an upper mask layer 51, a middle mask layer 53, and a lower mask layer 55. The middle mask layer 53 may include an upper middle mask layer 53a and a lower middle mask layer 53b.

The upper mask layer 51 has substantially the same size as the upper middle mask layer 53a when viewed in plan view. The lower middle mask layer 53b is substantially the same size as the lower mask layer 55 when viewed in plan view. For example, the upper mask layer 51 may overlap the upper middle mask layer 53a, and the lower middle mask layer 53b may overlap the lower mask layer 55. The upper mask layer 51 may have a larger size than the lower mask layer 55 when viewed in plan view.

A portion of a bottom surface of the upper middle mask layer 53a may be in contact with the top surface of the mask supporter 25 in FIG. 1. A side of the lower middle mask layer 53b and a side of the lower mask layer 55 may be in contact with the side of the mask supporter 25.

Figure 2B:
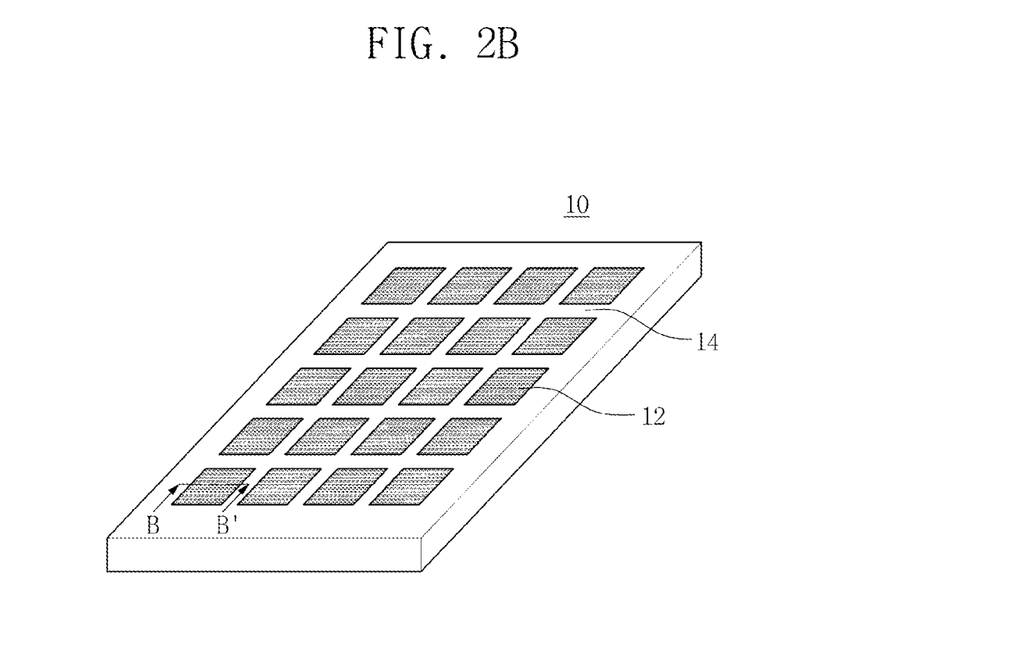
FIG. 2B is a perspective view illustrating a substrate according to an embodiment of the inventive concept.

FIG. 2B is a perspective view illustrating the substrate 10 according to an embodiment of the inventive concept. Referring to FIG. 2B, the substrate 10 may include a plurality of unit substrates 12 according to an embodiment of the inventive concept. A lattice-shaped substrate boundary 14 may be disposed between the unit substrates 12. The substrate boundary 14 may be vertically aligned with the mask boundary 54.

Figure 3:
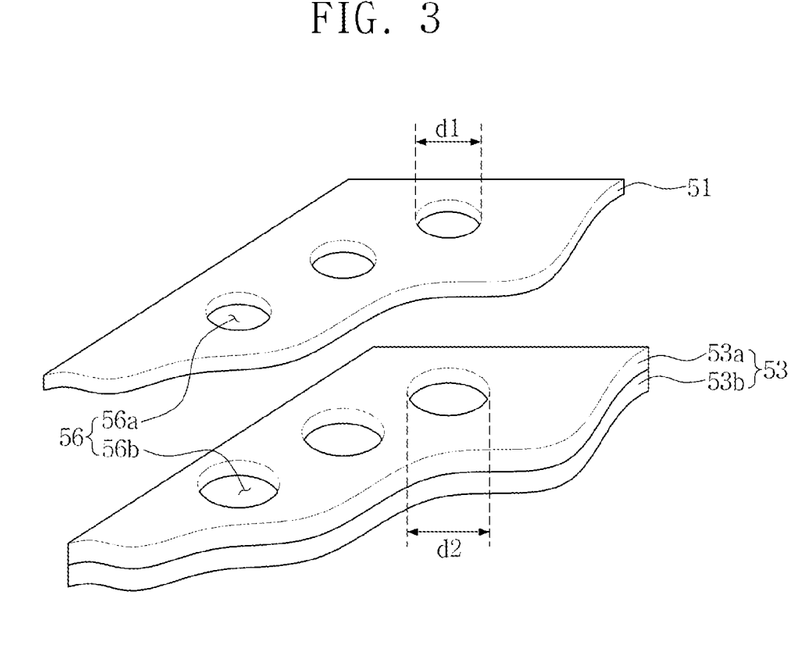
FIG. 3 is an enlarged view of a portion C of FIG. 2A illustrating portions of an upper mask layer and a middle mask layer.

FIG. 3 is an enlarged view of a portion C of FIG. 2A illustrating portions of the upper mask layer 51 and the middle mask layer 53. Referring to FIG. 3, the upper mask layer 51 and the middle mask layer 53 may include circular mask openings 56 through which the solder ball 60 may pass. The upper mask layer 51 may include an upper opening 56a, and the middle mask layer 53 may include a middle opening 56b. The upper opening 56a may be aligned with and overlap the middle opening 56b so that the upper opening 56a and the middle opening 56b may be substantially concentric. A diameter d1 of the upper opening 56a may be smaller than a diameter d2 of the middle opening 56b (d1<d2).

Figure 4:
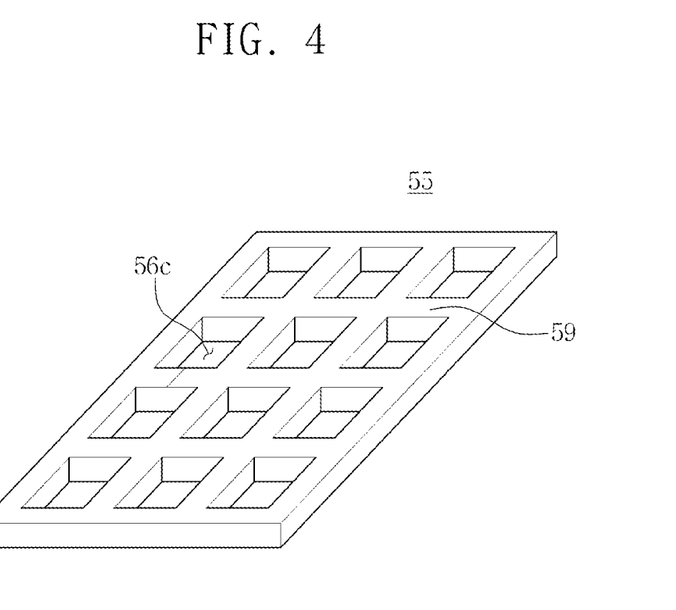
FIG. 4 is a perspective view illustrating a lower mask layer according to an embodiment of the inventive concept.

FIG. 4 is a perspective view illustrating the lower mask layer 55 according to an embodiment of the inventive concept. Referring to FIG. 4, the lower mask layer 55 may include a partition 59 defining lower openings 56c. The partition 59 may have a lattice shape to be aligned with the mask boundary 54. In other words, the partition 59 may overlap the mask boundary 54. The lower opening 56c may have a size to be aligned with and/or to correspond to the unit substrates 12. The lower mask layer 55 may support the upper mask layer 51 and the middle mask layer 53.

Since a diameter of the mask opening 56 may become small and the mask opening 56 may have an adhesive property when an inner wall of the mask opening 56 is heavily contaminated, the solder ball 60 may not pass through the mask opening 56 and may adhere to the inside wall of the mask opening 56. The solder ball mounter 100 according to an embodiment of the inventive concept may include the solder ball mask 50 including the mask opening 56 in which a diameter of a middle portion thereof is larger than a diameter of an upper portion thereof. Thus, contamination of the inner wall of the mask opening 56 by flux and/or other materials can be prevented or substantially reduced. The solder ball mounter 100 according to an embodiment of the inventive concept can improve stability and productivity in a solder ball mounting process.

Figure 5A:
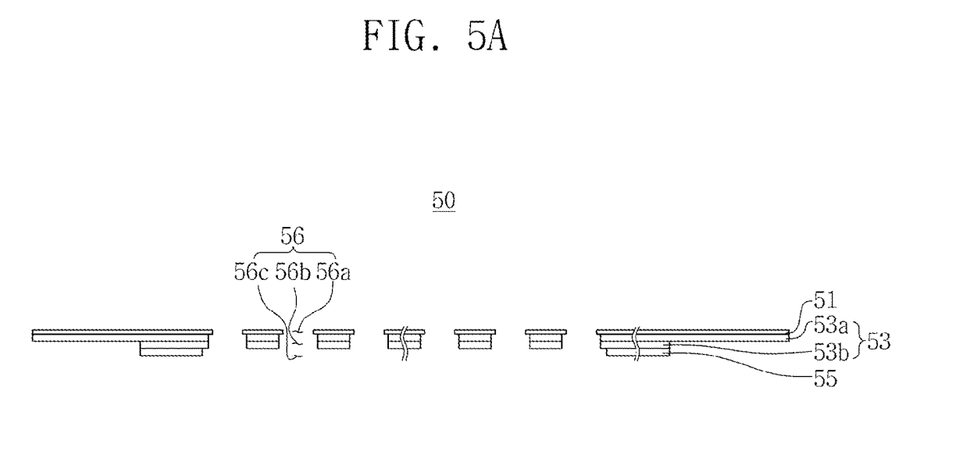
FIGS. 5A and 5B are longitudinal cross-sectional views taken along lines A-A' and B-B' of FIGS. 2A and 2B according to an embodiment of the inventive concept.
Figure 5B:
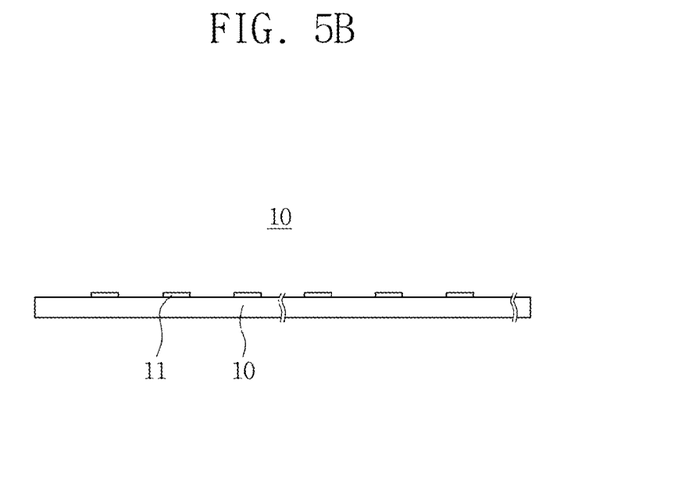

FIGS. 5A and 5B are cross-sectional views taken along lines A-A' and B-B' of FIGS. 2A and 2B according to an embodiment of the inventive concept. FIG. 5A conceptually illustrates a portion of the solder ball mask 50, for example, the unit mask 52. Referring to FIG. 5A, the solder ball mask 50 or the unit mask 52 according to an embodiment of the inventive concept may include the upper mask layer 51 including the upper opening 56a, the middle mask layer 53 including the middle opening 56b, and the lower mask layer 55 including the lower opening 56c. The mask opening 56 may include the upper opening 56a, the middle opening 56b, and the lower opening 56c. The upper opening 56a and the middle opening 56b may be structured to receive the solder ball 60. The lower opening 56c may expose the unit substrate 12. One upper opening 56a may correspond to one middle opening 56b. One lower opening 56c may correspond to a plurality of upper openings 56a and a plurality of middle openings 56b. A diameter of the upper opening 56a may be about 1.2 to about 1.3 times that of the solder ball 60. A diameter of the middle opening 56b may be larger than that of the upper opening 56a. For example, the diameter of the middle opening 56b may be 1.3 to 1.4 times that of the solder ball 60. The lower opening 56c may include an open area corresponding to a size of the unit substrate 12. Since the diameter of the upper opening 56a may be smaller than that of the middle opening 56b, the contamination of the inner wall of the mask opening 56 by flux 13 can be reduced. In addition, even when the inner wall of the upper opening 56a is contaminated by the flux 13, contaminant of the inner wall of the upper opening 56a can be removed by the solder ball 60 passing through the upper opening 56a. The upper mask layer 51 may have a sufficient thickness to substantially prevent deformation by weight of the solder ball 60. For example, the thickness of the upper mask layer 51 may be about 20 μm to about 40 μm. Preferably, the thickness of the upper mask layer 51 may be about 30 μm. A thickness of the middle mask layer 53 and a thickness of the lower mask layer 55 may be larger than that of the upper mask layer 51. For example, the thickness of each of the middle mask layer 53 and the lower mask layer 55 may be 50 μm to 70 μm.

FIG. 5B conceptually illustrates a portion of the substrate 10, for example, the unit substrate 12. Referring to FIG. 5B, the substrate 10 or the unit substrate 12 according to an embodiment of the inventive concept may include a plurality of electrodes 11. The substrate 10 may include a printed circuit board (PCB). The electrodes 11 may include a metal such as copper (Cu), nickel (Ni), or gold (Au). The solder balls 60 may be aligned with and mounted on the electrodes 11. Referring further to FIG. 1, the flux 13 may be provided on the electrodes 11. The flux 13 may include an organic solvent having viscosity. The flux 13 may temporarily fix the solder balls 60 onto the electrodes 11 of the substrate 10 and prevent the electrodes 11 from being oxidized.

Figure 6A:
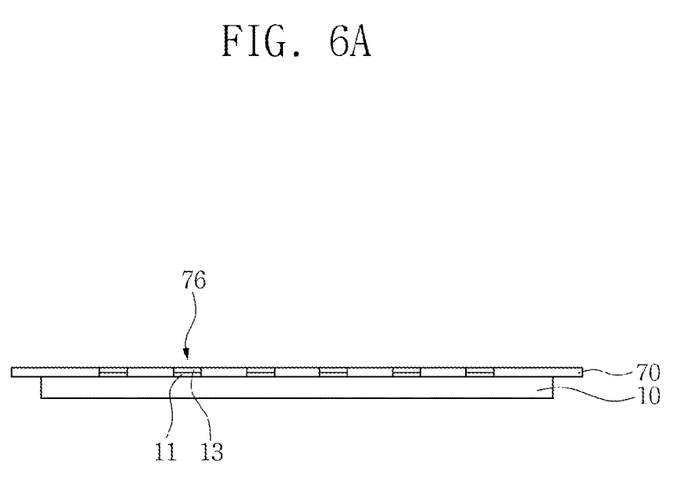
FIGS. 6A to 6D are views illustrating a specific example of a method of mounting solder balls according to an embodiment of the inventive concept.

FIGS. 6A to 6D are cross-sectional views illustrating a solder ball mounting method according to an embodiment of the inventive concept. Referring to FIG. 6A, a solder ball mounting method according to an embodiment of the inventive concept may include arranging a flux mask 70 on a substrate 10. The flux mask 70 may include a plurality of flux openings 76 aligned with the electrodes 11 located on the substrate 10. Next, the method may include providing the flux 13 onto the electrodes 11 by performing, for example, a screen printing process or the like, using the flux mask 70. Next, the method may include removing the flux mask 70.

Figure 6B:
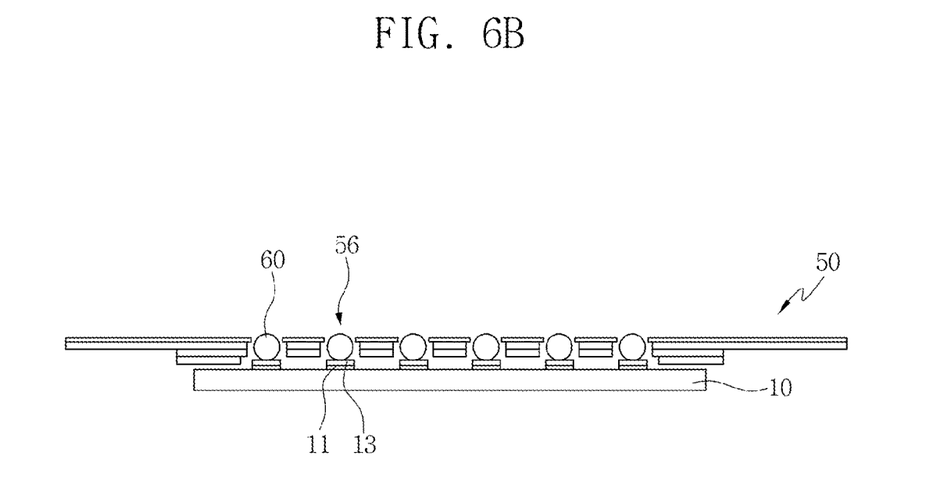

Referring to FIG. 6B, the method may include aligning a solder ball mask 50 with the substrate 10, and providing solder balls onto the electrodes 11 through the mask openings 56 with reference further to FIG. 1. The mask openings 56 of the solder ball mask 50 may be substantially aligned with the electrodes 11 of the substrate 10, respectively. The solder ball mask 50 may be spaced apart from a top surface of the substrate 10 by a predetermined gap. The method may include removing the solder ball mask 50 from the substrate 10 after the solder balls 60 are mounted on the flux 13.

Figure 6C:
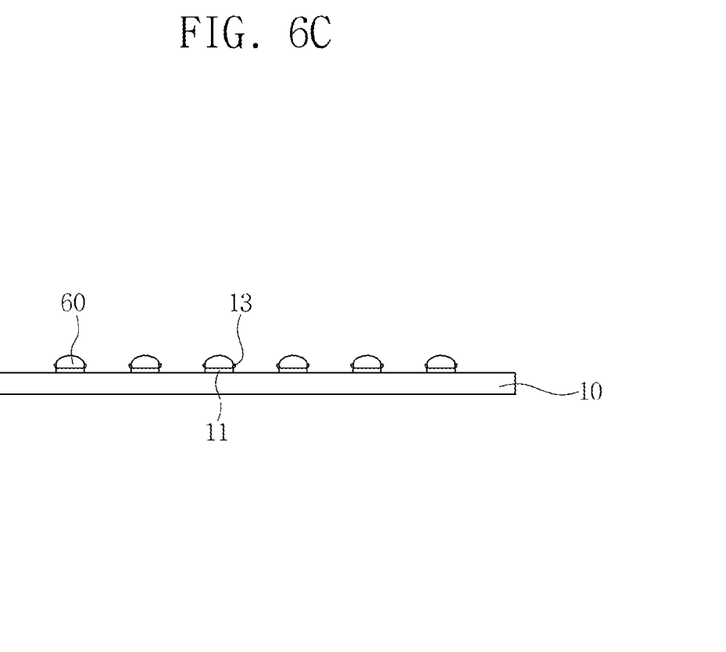

Referring to FIG. 6C, the method may include bonding the solder balls 60 with the electrodes 11 by performing a heating process such as a reflowing process. At this time, the solder balls 60 may be reflowed and formed into a hemispherical shape. Although most of the flux 13 is volatilized and removed by heating, the flux 13 may be left on the top surface of the substrate 10.

Figure 6D:
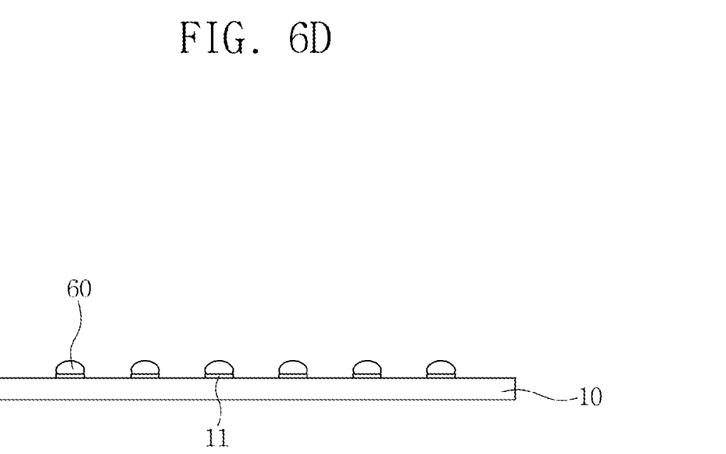

Referring to FIG. 6D, the method may include removing the residual flux 13 and contaminants left around the electrode 11 and on the substrate 10 by performing a cleaning process.

The solder ball mounter according to the inventive concept can substantially prevent or alleviate contamination of a mask opening due to flux in a solder ball mounting process.

The solder ball mounting method according to the inventive concept can improve productivity of a solder ball mounting process by preventing contamination of a mask opening by flux.

The foregoing is illustrative of embodiments and is not to be construed as limiting thereof. Although a few embodiments have been described, those skilled in the art will readily appreciate that many modifications are possible without materially departing from the scope of novel teachings and advantages of the inventive concept as defined by the claims. In the claims, means-plus-function clauses are intended to cover the structures described herein as performing the recited function, and not only structural equivalents but also equivalent structures.

What is claimed is:
1. A solder ball mounter, comprising:
a stage configured to support a substrate having electrodes formed thereon;
a ball placer head configured to provide solder balls; and
a solder ball mask configured to align the solder balls with the electrodes formed on the substrate;
wherein the solder ball mask includes:
an upper mask layer including at least one upper opening having a first diameter wherein inner wall of the upper opening is substantially vertical;
a middle mask layer including at least one middle opening having a second diameter greater than the first diameter wherein inner wall of the middle opening is substantially vertical; and
a lower mask layer,
wherein the middle mask layer is thicker than the upper mask layer; and wherein the middle mask layer includes an upper middle mask layer and a lower middle mask layer, the upper mask layer has substantially the same size as the upper middle mask layer in plan view, and the lower middle mask layer has substantially the same size as the lower mask layer in plan view; and wherein the stage includes:

a base;

a substrate mounter disposed on a central portion of the base and configured to support the substrate; and a mask supporter disposed on a peripheral portion of the base and configured to support and affix the solder ball mask; and wherein a bottom surface of the upper middle mask layer is in contact with a top surface of the mask supporter, and a side of the lower middle mask layer and a side of the lower mask layer are in contact with a side of the mask supporter.

2. The mounter of claim 1, wherein the solder ball mask includes:

a plurality of unit masks, wherein the at least one upper opening and the at least one middle opening are arranged in each of the unit masks; and a lattice-shaped mask boundary configured to define the plurality of unit masks.

3. The mounter of claim 2, wherein the lower mask layer includes:

a plurality of lower openings aligned with corresponding ones of the plurality of unit masks; and a lattice-shaped partition wall configured to define the plurality of lower openings.

4. The mounter of claim 2, wherein the at least one upper opening includes a plurality of upper openings, wherein the at least one middle opening includes a plurality of middle openings, and wherein each unit mask further comprises one lower opening, and wherein the one lower opening overlaps ones of the plurality of upper openings and ones of the plurality of middle openings in a corresponding unit mask.

5. The mounter of claim 1, wherein the at least one upper opening and the at least one middle opening each have a circular shape and overlap with each other, and wherein the at least one upper opening and the at least one middle opening are aligned substantially concentrically.

6. The mounter of claim 1, wherein the solder ball mask includes a nickel (Ni) alloy.

7. The mounter of claim 1, wherein the ball placer head includes:

a ball provider configured to provide the solder balls; and an air generator disposed on a bottom surface of the ball provider.

8. The mounter of claim 7, wherein the air generator is spaced apart from a top surface of the solder ball mask and configured to jet air onto the top surface of the solder ball mask to form an air curtain between the top surface of the solder ball mask and the air generator.

* * * * *